(12) United States Patent
Francis

(10) Patent No.: US 7,145,759 B2
(45) Date of Patent: Dec. 5, 2006

(54) OVERCURRENT PROTECTION CIRCUIT INCLUDING AUTO-RESET BREAKER AND PTC RESISTOR

(75) Inventor: Roderick M. Francis, Clayton, NC (US)

(73) Assignee: Shallco, Inc., Smithfield, NC (US)

( * ) Notice: Subject to any disclaimer, the term of this patent is extended or adjusted under 35 U.S.C. 154(b) by 42 days.

(21) Appl. No.: 10/877,321

(22) Filed: Jun. 25, 2004

(65) Prior Publication Data

US 2006/0002046 A1 Jan. 5, 2006

(51) Int. Cl.
*H02H 9/00* (2006.01)

(52) U.S. Cl. .......................... 361/58; 361/106

(58) Field of Classification Search ............. 361/58, 361/106

See application file for complete search history.

(56) References Cited

U.S. PATENT DOCUMENTS

| | | | |
|---|---|---|---|
| 3,249,810 A * | 5/1966 | Storm et al. ................ 361/3 |
| 4,937,696 A | 6/1990 | Yoshino et al. ............ 361/11 |
| 5,864,458 A * | 1/1999 | Duffy et al. ............... 361/93.9 |
| 6,278,596 B1 | 8/2001 | Simpson .................... 361/42 |
| 6,437,544 B1 | 8/2002 | Yang ......................... 320/167 |

* cited by examiner

*Primary Examiner*—Ronald Leja
(74) *Attorney, Agent, or Firm*—Coats & Bennett, P.L.L.C.

(57) ABSTRACT

An overcurrent protection circuit for low-voltage, high-current electrical systems comprises a Positive Temperature Coefficient (PTC) resistor in series with an auto-reset thermal breaker. The breaker allows for intermittent current within an assumed product usage duty cycle, and repeatedly trips and resets on sustained high current usage or during a short-circuit fault. The PTC resistor limits current in the system to a low value when the temperature rises to the PTC resistor's trip point. The PTC resistor protects the system from thermal damage during the non-breaker-tripped portions of sustained high current use, or during continuous low-current use. The use of both the PTC resistor and auto-reset breaker provides thermal overcurrent protection while allowing for performance claims based on an assumed duty cycle of product use.

23 Claims, 10 Drawing Sheets

OVERCURRENT PROTECTION CIRCUIT INCLUDING AUTO-RESET BREAKER AND PTC RESISTOR

BACKGROUND

The present invention relates generally to the field of electrical breakers and in particular to an auto-reset breaker that handles faults safely.

Automatically resetting thermal breakers are widely used for protecting winches and other high-current accessories sold in the aftermarket automotive, ATV and off-road vehicles market. These auto-reset breakers allow for brief or intermittent high currents, but will trip, or cause an open circuit and thus prohibit current flow, under sustained high current. The breakers are thermally actuated.

A representative auto-reset thermal breaker comprises a bi-metal element and a pair of contacts. The bi-metal element changes shape when heated, breaking the contacts and opening the circuit. A snap action is accomplished by forming the bi-metal element into a shape that inverts as a reaction to reaching a design temperature. Once the circuit opens, the bi-metal element begins to cool and returns (snaps) back to the closed position, allowing current to flow. This is the auto-reset feature.

The breaker trip curve is based on a time/temperature relationship. Breakers are rated for the maximum sustained current that they will allow to flow continuously without tripping. That is, the breaker rated current is the maximum "never trip" current value. A characteristic of auto-reset thermal breakers is allowing brief or intermittent currents far in excess of their rated capacity, tripping only when the current generates sufficient heat.

Since intermittent use of the targeted products is expected, these products are sold with performance claims that exceed actual performance available under sustained conditions. That is, the claims assume a duty-cycle for the products' use. The manufacturers use under-rated auto-reset breakers for fault protection. The breakers are sized to allow for claims of product performance and protection of the device that are only true under the assumed duty cycle. For example, the manufacturer of a bumper-mounted winch may assume a usage duty cycle of thirty seconds use during any four minute period. The manufacturer may then choose an auto-reset breaker that will not heat up sufficiently under the current load to trip within thirty seconds, although it will trip if the current load is sustained much longer than thirty seconds (e.g., the current load exceeds the rating of the breaker). The three and a half minutes of assumed non-use is sufficient time for the breaker to cool, so as to not trip during another thirty seconds of use. This duty cycle may be typical of a one using the winch to pull a truck out of the mud, and the typical user will experience the performance claimed by the manufacturer.

One using his winch all day to pull stumps from the ground, however, will exceed the designed duty cycle, and will experience repeated tripping of the breaker. During such sustained high-current use—which also occurs under a short-circuit condition—the auto-reset breaker will continue resetting, continuing to allow intermittent high currents in the system. These repeated high-current conditions could cause wiring and other system components to heat up to dangerous levels, creating a fire hazard.

Protective devices other than auto-reset breakers are rarely used due to adverse customer perception. For example, fuses are never used because blowing a fuse prevents use of the product until the fuse is changed, and leads to customer perception of inferior quality. Manual reset breakers are sometimes used but are considered a nuisance by customers, and are often defeated to prevent them from tripping.

Hence a need exists in the art for an overcurrent protection circuit that allows for the industry practice of duty-cycle based performance claims, and additionally provides effective protection against high-current thermal damage.

SUMMARY

In one aspect, the present invention relates to an overcurrent protection circuit to limit the current in an electrical system. The overcurrent protection circuit includes a first component having conductive and nonconductive states, and assuming the nonconductive state to interrupt current flow through the circuit for a duration in response to detecting sustained current in excess of a first predetermined current value, the first component returning to the conductive state following the duration. The overcurrent protection circuit further includes a second component connected in series with the first component and operative to limit the current through the circuit to a second predetermined current value less than the first predetermined value in response to heat in excess of a predetermined thermal value.

In another aspect, the present invention relates to a method of protecting an electrical system from excessive current. Sustained current in excess of a first predetermined current value is detected. Current flow through the system is interrupted for a duration in response to detecting the excess current, and the current flow is restored following the duration. Heat in the electrical system in excess of a predetermined thermal value is detected, and the current in the system is limited to a second predetermined current value less than the first predetermined current value in response to detecting the excess heat.

In yet another aspect, the present invention relates to an overcurrent protection circuit having an input and an output. The overcurrent protection circuit includes an auto-reset breaker having a rated current connected to one of the input or the output, and one or more positive temperature coefficient (PTC) resistors connected in parallel with each other and having a trip point, connected in series with the breaker and connected to the other one of the input or the output.

In still another aspect, the present invention relates to an electrical system. The electrical system includes a power source, a load connected to the power source, and an overcurrent protection circuit connected in series between the power source and the load. The overcurrent protection circuit has an input and an output and includes an auto-reset breaker connected to one of the input or the output, and one or more positive temperature coefficient resistors connected in parallel with each other, connected in series with the breaker and connected to the other one of the input or the output In still another aspect, the present invention relates to a vehicle. The vehicle includes an electrical power source, a load connected to the power source, and an overcurrent protection circuit connected in series between the power source and the load. The overcurrent protection circuit has an input and an output and includes an auto-reset breaker connected to one of the input or the output, and one or more positive temperature coefficient resistors connected in parallel with each other, connected in series with the breaker and connected to the other one of the input or the output

DETAILED DESCRIPTION

The present invention relates to an overcurrent protection circuit, particularly suited for low-voltage, high-current products, which fully protects the products from the adverse thermal effects of high currents while allowing present manufacturing practices and product claims. However, the present invention is not limited to such application, and may find utility in a broad range of applications. According to the present invention, both an auto-reset thermal breaker and a Positive Temperature Coefficient (PTC) resistor are connected in series to control excess temperatures resulting from high currents.

A PTC resistor is a passive resistive device that exhibits a threshold change in resistance in response to temperature. The PTC resistor exhibits a low resistance at room temperature. The resistance of a PTC resistor increases slightly at higher temperature, up to a "trip" temperature. Once tripped, the PTC resistor exhibits a very high resistance that is substantially constant with further increases in temperature. The trip point resistance allows only enough current flow to maintain the tripped state. The PTC is self-healing; upon cooling below the trip temperature it resumes a low resistance. The PTC resistor does not depend on a time/temperature relationship, but rather trips immediately when the trip temperature is reached.

Figure 1:
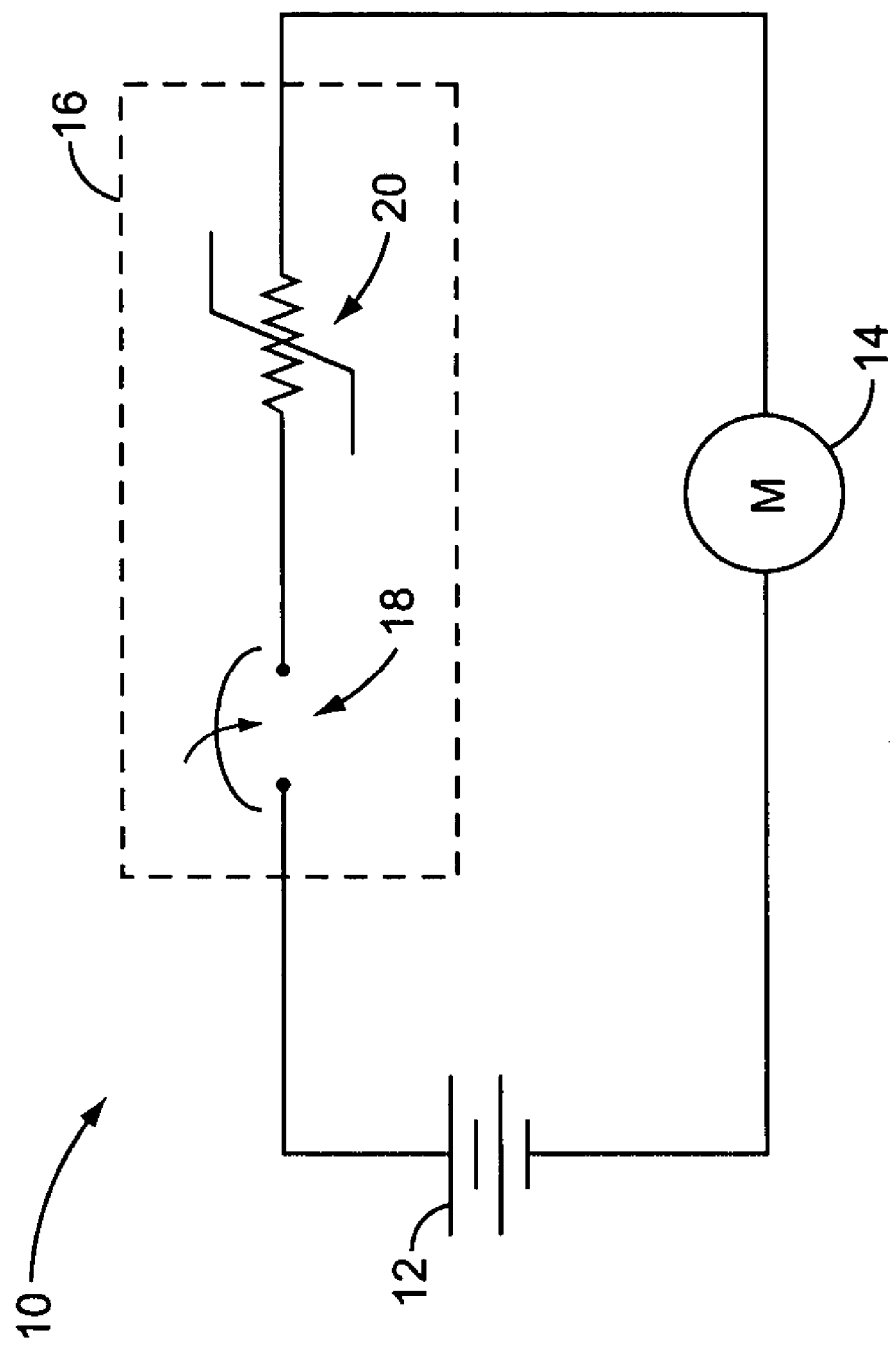
FIG. 1 is a schematic diagram of a representative electrical system including an overcurrent protection system according to one embodiment of the present invention.

FIG. 1 depicts a schematic diagram of a representative electrical system using the overcurrent protection circuit of the present invention, indicated generally at 10. The system includes a power source such as a battery 12 and a load such as a motor 14 (which may, for example, comprise a winch). The overcurrent protection circuit 16 includes an auto-reset thermal breaker 18 and a PTC resistor 20, connected in series. The breaker 18 will trip on sustained high current use, but will not trip on intermittent use, such as use within the motor manufacturer's assumed duty cycle. The breaker 18 tripping is a function of the current through it in excess of its rating and the duration of that sustained excess current. Use of the product within and near its design duty cycle is not affected by the PTC resistor 20, which maintains a low resistance.

During heavy constant use or under a short-circuit fault, the PTC resistor 20 heats up due to the intermittent but repeated high current conditions when the auto-reset breaker 18 resets and allows current flow. When the PTC resistor 20 reaches its characteristic trip temperature, it exhibits a very high resistance, limiting the current to a very low value, such as on the order of 0.5A. The PTC resistor 20 thus protects the system from run-away thermal overload due to high current, protecting the system against fire hazard.

Figure 2:
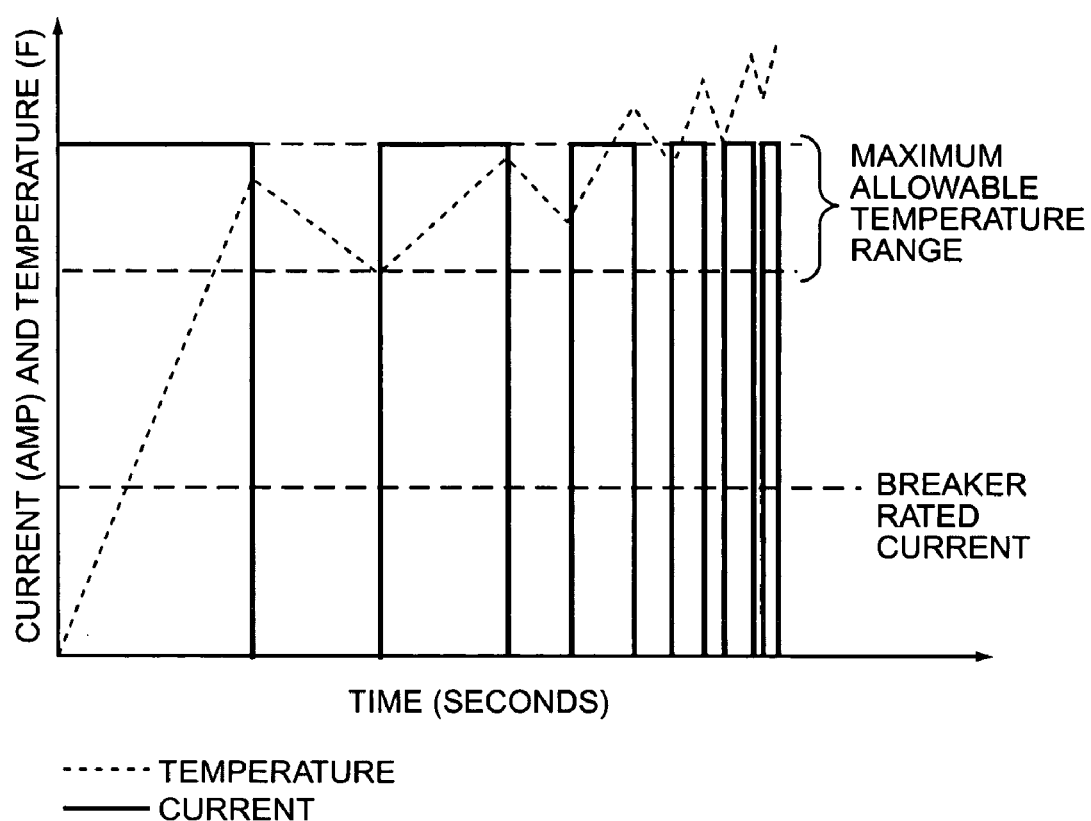
FIG. 2 is a graph depicting both current and temperature in a system with only an auto-reset breaker.

FIG. 2 depicts the thermal hazard of prior art current protection circuits comprising only an auto-reset breaker 18, when the load is run outside its assumed duty cycle (such as continuously) or during a short-circuit fault. Current well in excess of the rated current value of the breaker 18 flows, causing the temperature of wires and other circuit components to rise steadily. When the temperature within the auto-reset breaker 18 reaches sufficiently high value, the breaker 18 trips, opening the circuit and dropping the current flow to zero. The breaker 18 and other circuit components begin to cool. When the breaker 18 cools sufficiently, it resets, and high current again flows in the circuit, heating circuit components as well as the breaker 18. This trip-reset cycle continues indefinitely, allowing circuit component temperatures to rise to dangerous levels.

Figure 3:
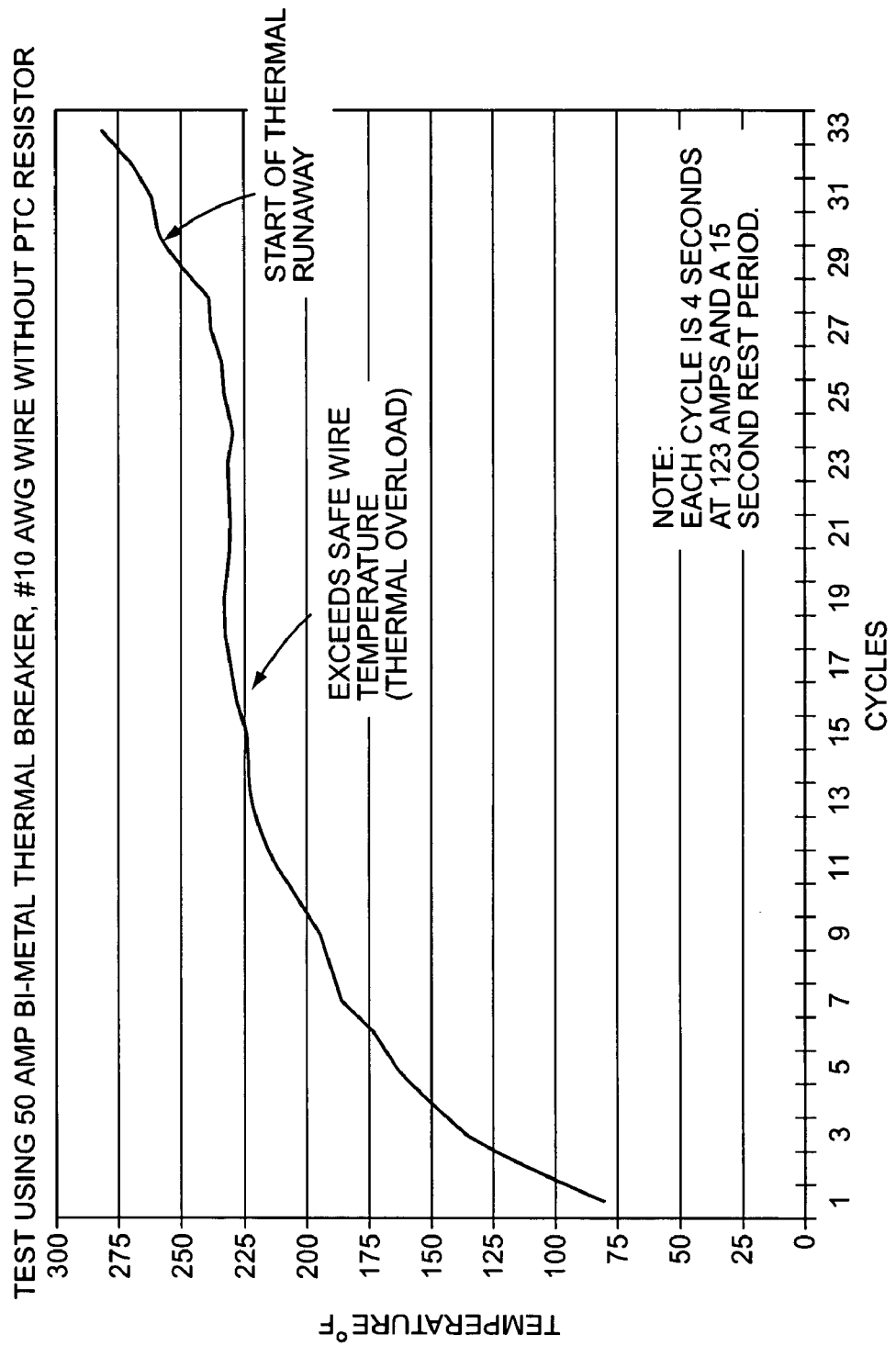
FIG. 3 is a graph of the wire temperature in an electrical system.

The auto-reset breaker 18 need not even trip and reset to generate a fire hazard. FIG. 3 depicts a graph of the temperature of a #10 AWG wire carrying 123A in a duty cycle comprising four seconds of current flow and a fifteen second rest period, through an auto-reset breaker 18 rated at 50A. Although the wire is carrying over twice the current for which the breaker 18 is rated, the breaker 18 never trips due to the duty cycle providing sufficient cool-off time. As shown, the wire exceeds a safe temperature, and with continued cycling of the high current, goes into thermal runaway.

Figure 4:
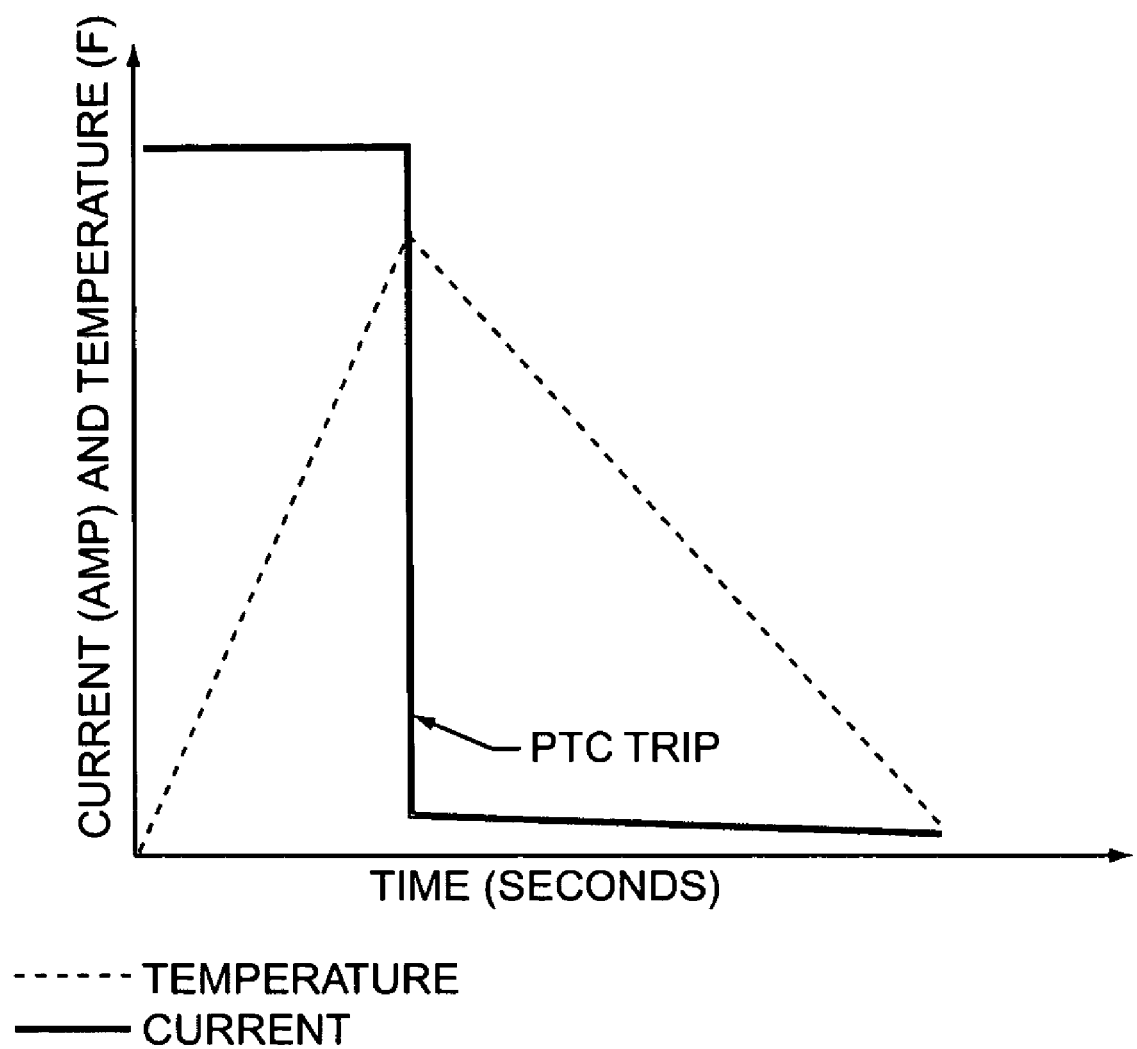
FIG. 4 is a graph depicting both current and temperature with a PTC resistor in the circuit.

FIG. 4 depicts the current and temperature curves of circuit components in a circuit including a PTC resistor 20. Initial high current is not attenuated due to the low resistance of the PTC resistor 20 at normal temperatures. As the temperature increases, it reaches the trip point of the PTC resistor 20, causing the PTC resistor 20 to "trip," or assume a high resistance. This high resistance allows only enough current to flow to maintain the tripped state. As the current is severely limited, the wire and other circuit components rapidly cool.

Figure 5:
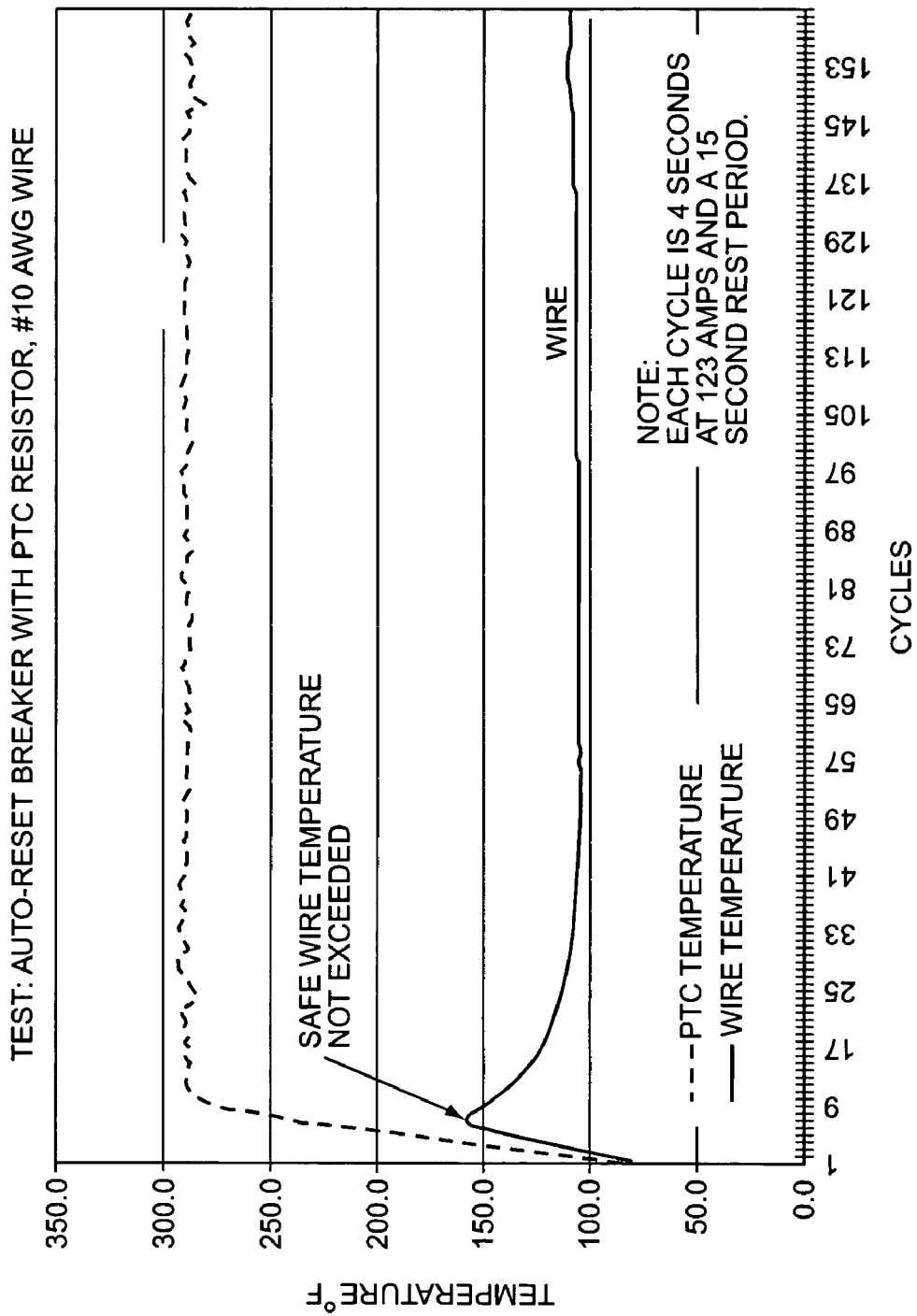
FIG. 5 is a graph of the wire temperature and PTC resistor temperature in an electrical system.

FIG. 5 depicts a circuit with a PTC resistor 20 in series with an auto-reset breaker 18. In this case, the PTC resistor 20 thermal trip point is just over 150° F. When the PTC resistor 20 trips, current in the system is limited to approximately 0.5A, holding the wire temperature down to just over 100° F., well below the wire's safe temperature limit. Note that the temperature of the PTC resistor 20 itself continues to rise with (limited) current flow, until it reaches a maximum of just below 300° F. The PTC resistor 20 reaches equilibrium at that point, and will not heat further, as it is limiting the current flow by its tripped (high) resistance.

Figure 6:
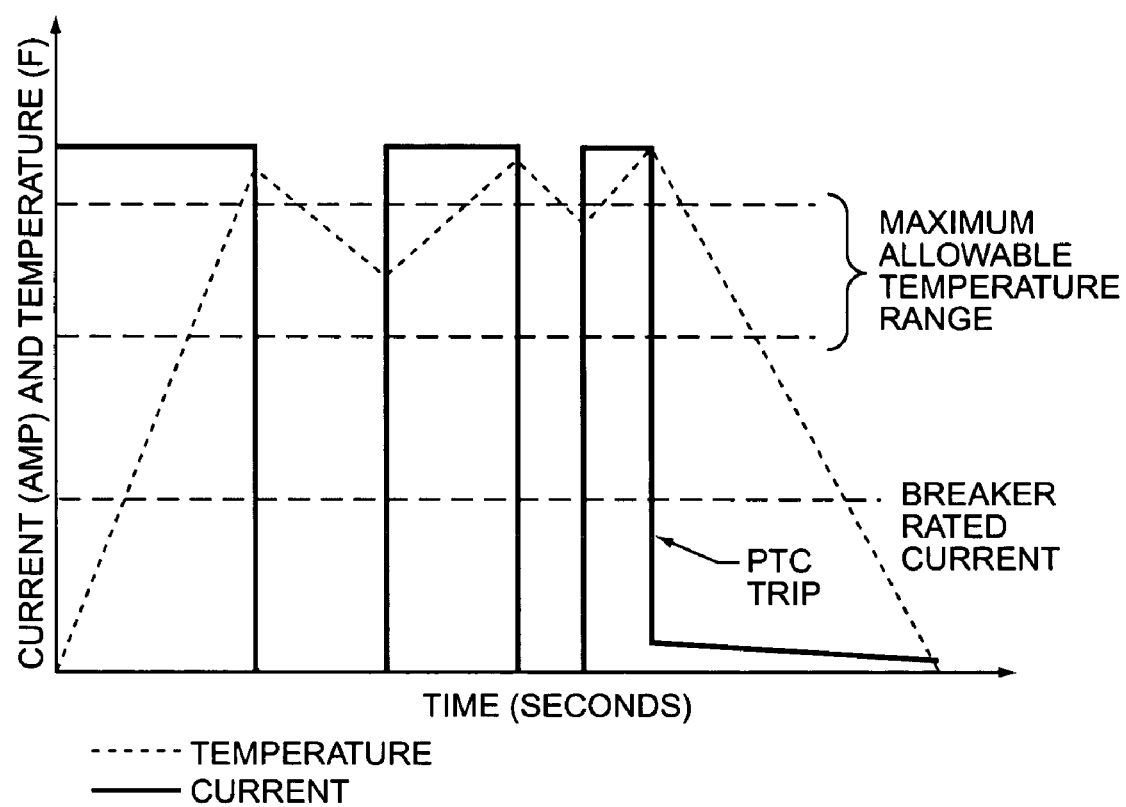
FIG. 6 is a graph depicting both current and temperature in a system with both an auto-reset breaker and a PTC resistor according to the present invention.

FIG. 6 depicts the operation of both the auto-reset breaker 18 and the PTC resistor 20 of the present invention. The graph depicts the current flow and temperature of a wire or other circuit component where the load 14 is used outside its designed duty cycle (such as continuously) or where the circuit includes a short-circuit fault. Initial high current, well in excess of the rated current of the auto-reset breaker 18, causes the temperature to rise. As the temperature of the breaker 18 rises, the breaker 18 trips and the current flow drops to zero. As the breaker 18 cools, it resets and high currents flow once more. This process continues, with circuit component temperatures at or briefly exceeding maximum allowable temperatures, as shown. When the temperature of the PTC resistor 20 reaches its trip point, however, the PTC resistor 20 trips, exhibits a high resistance, and limits the current. System components rapidly cool due to the low current flow.

Figure 7:
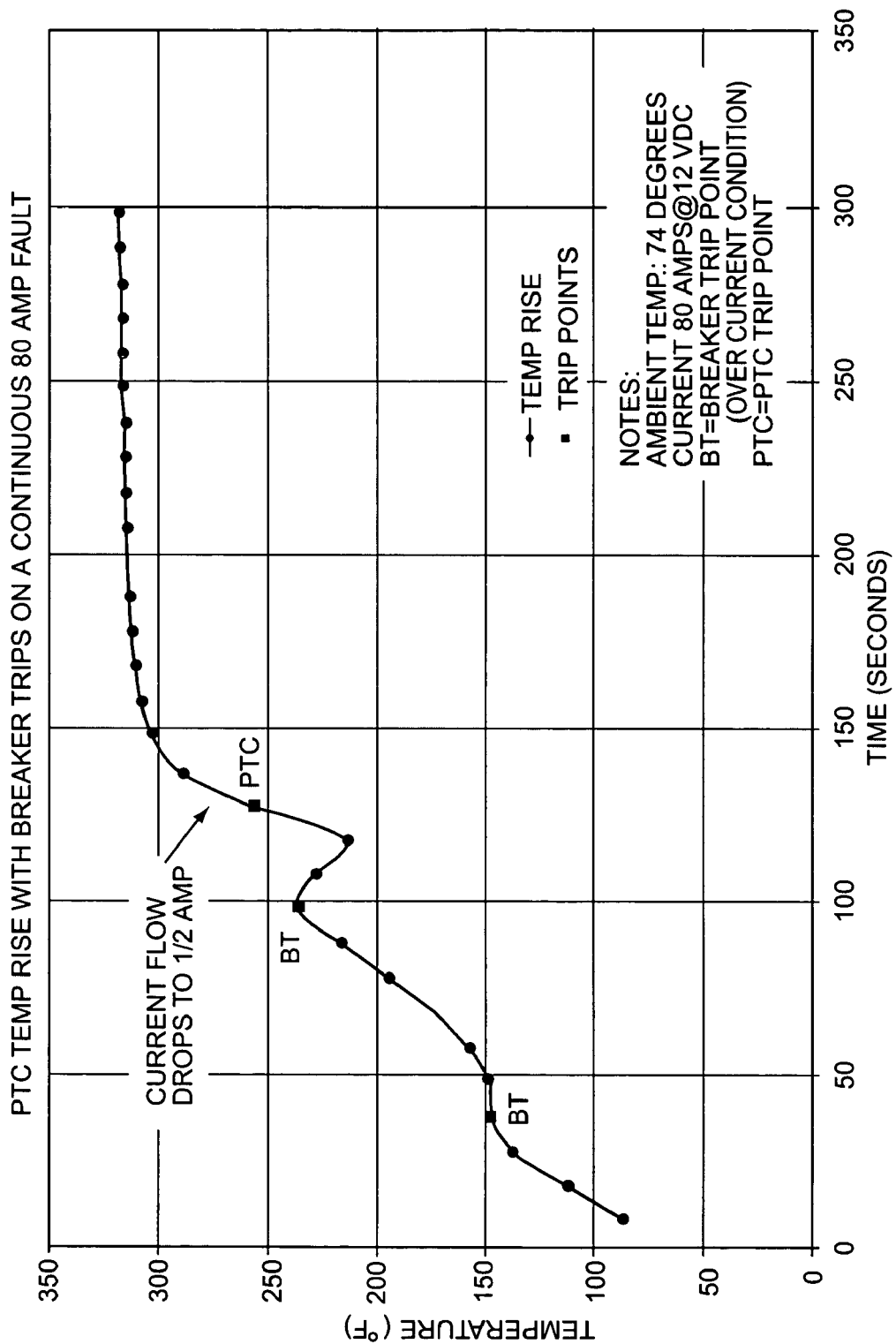
FIG. 7 is a graph of PTC resistor temperature in a circuit including an auto-reset breaker.

FIG. 7 depicts the operation of both the auto-reset breaker 18 and the PTC resistor 20 of the present invention, as demonstrated by the temperature of the PTC resistor 20. A continuous 80A current flows through a 50A auto-reset breaker 18 and PTC resistor 20, simulating continuous use or a short-circuit fault. The breaker 18 allows the current to flow for approximately 40 seconds, and then trips due to heating. While the breaker 18 is open, the temperature stays at 150° F., or drops slightly. When the breaker 18 cools due to no current flow, it auto-resets, and again passes the full 80A. The PTC resistor 20 continues to heat up to approximately 240° F. as the 80A current flows for another 50 seconds, when the breaker 18 trips again. The PTC resistor 20 then cools while the auto-reset breaker 18 is tripped and no current flows. At about 120 seconds, the breaker 18, having cooled sufficiently, again resets, passing the full 80A and causing the PTC resistor 20 to immediately heat further. As the PTC resistor 20 passes 255° F., it reaches its trip temperature and assumes a high resistance value, dropping the current from 80A to approximately 0.5A. The PTC resistor 20 continues to heat due to the 0.5A current flow, reaching a stable temperature of 320° F.

Figure 8:
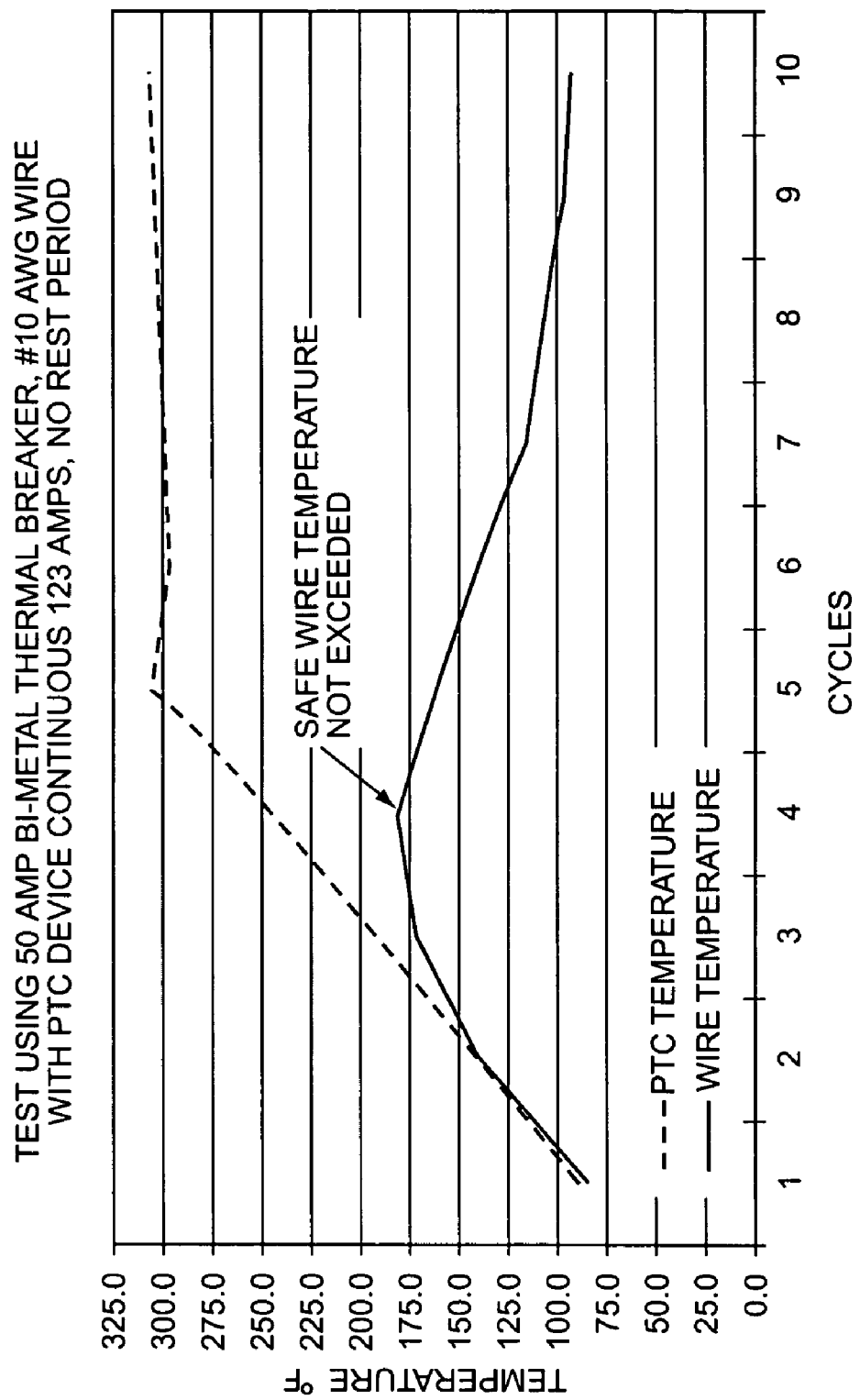
FIG. 8 is a graph of wire temperature depicting operation of a PTC resistor when an auto-reset breaker does not trip.

Depending on the component values selected, the PTC resistor 20 may provide system thermal protection when the auto-reset breaker 18 never trips. FIG. 8 depicts the temperature of a PTC resistor 20 and a #10 AWG wire carrying 123A continuously. Initially, the temperature of both the PTC resistor 20 and the wire rise as the current flows. The PTC reaches its trip point of just over 175° F., sharply increasing its resistance and limiting the current in the wire. Note that the auto-reset breaker 18 in this case never tripped, due to the relatively low trip point of the PTC resistor 20. After tripping, the PTC resistor 20 continues to heat up due to the limited current flow, until it reaches an equilibrium temperature of approximately 300° F. After the PTC resistor 20 trips, the wire carries only a limited current, and the temperature of the wire continues to drop.

In a manner similar to the example of FIG. 8, the PTC resistor 20 also provides protection in the case of sustained use at low currents that cause thermal overload. Returning to the winch example, if the winch 14 were run with no load (such as with no cable attached) for prolonged periods, the current load may never exceed the rating of the auto-reset breaker 18, so the breaker 18 will never trip. However, even the low current load, if sustained for hours, may cause the wiring or other system components to overheat sufficiently to present a fire hazard. In this case the PTC resistor 20 will severely limit the current when it reach its thermal trip point, obviating a fire hazard that the auto-reset breaker 18 cannot address.

Figure 9:
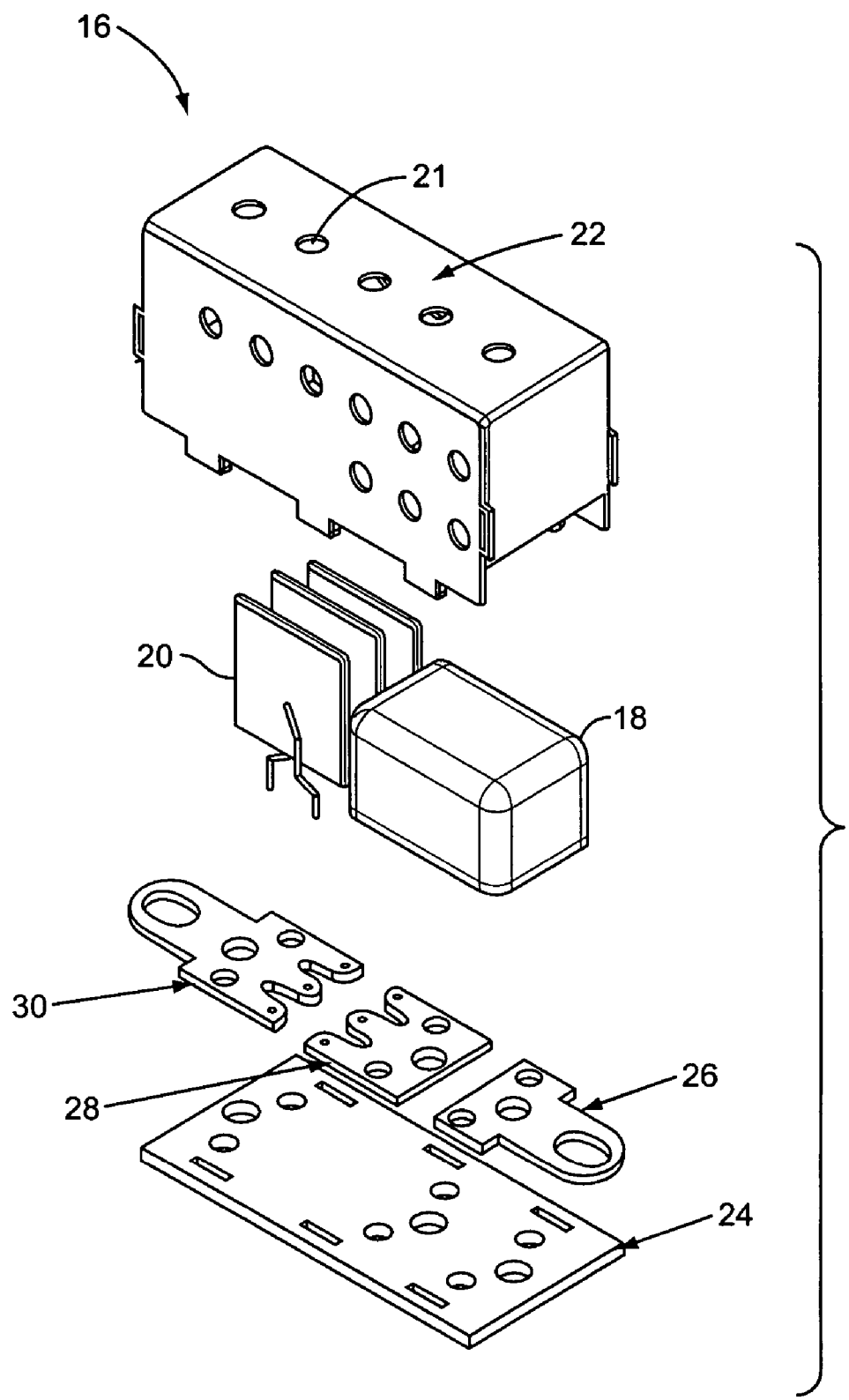
FIG. 9 is an exploded perspective view of an overcurrent protection circuit according to one embodiment of the present invention.

The PTC resistor 20 and auto-reset breaker 18 are preferably connected in series, so that the same current flows through both components. One form of mounting these components is depicted in FIG. 9. The circuit of FIG. 9 comprises three conductive nodes: an input 30, and output 26, and a common node 28 connecting the PTC resistor 20 and the auto-reset breaker 18 (those of skill in the art will note that the node 26 may be an input and the node 30 an output). The PTC resistor 20 and the auto-reset breaker 18 are respectively connected to one of the input 30 or output 26 nodes. The conductive nodes 26, 28, 30 are preferably connected to an insulating base 24. The components of the overcurrent protection circuit 16 may be mechanically assembled with fasteners, adhesives, solder, or other methods, not shown, as well known in the art.

Figure 10:
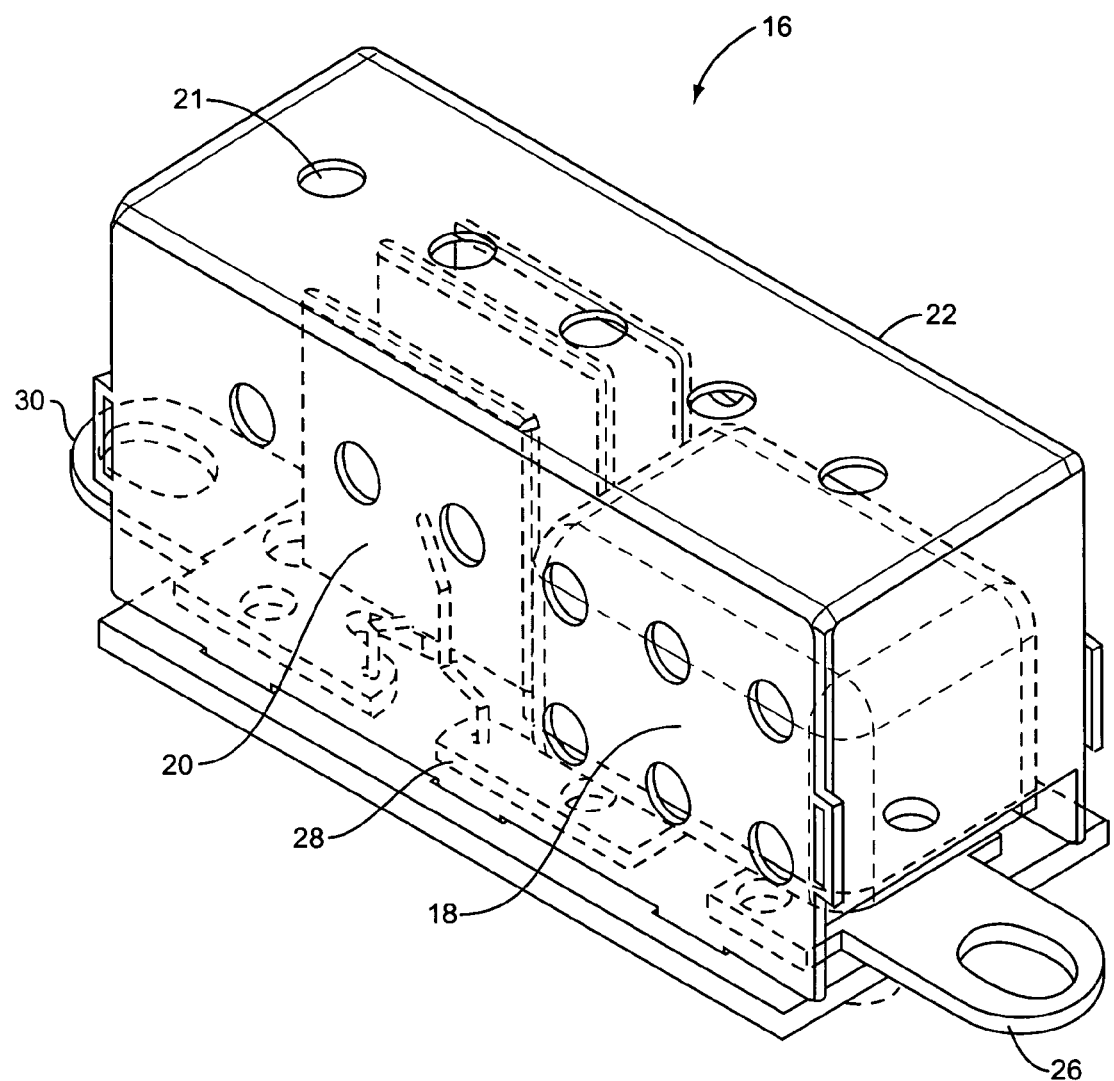
FIG. 10 is a perspective view of an overcurrent protection circuit according to one embodiment of the present invention.

As depicted in FIGS. 5, 7 and 8, the PTC resistor 20 may reach temperatures in the range of 300° F. when providing current-limiting protection in tripped mode. This in itself may represent a hazard, and/or a product liability exposure. According to the present invention, a thermal housing 22 contains both the PTC resistor 20 and the auto-reset breaker 18, as depicted in FIGS. 9 and 10. The housing 22 includes a plurality of ventilation holes 21 for controlled conductive and convective cooling. The housing 22 also reduces the effect of ambient temperature on the PTC resistor 20, providing more consistent operation over a range of temperatures.

While reference is made herein to "a" or "the" PTC resistor 20, as shown in FIGS. 9 and 10, the PTC resistor component 20 may comprise two or more PTC resistor elements 20 connected in parallel. This may be necessary to provide the desired thermal properties in a small form factor, and/or to achieve sufficiently low resistance at ambient temperature. Connecting resistive elements 20 in parallel reduces their effective resistance, as well known in the art, and the component values and effective resistance may easily be calculated for a given application by those of skill in the art.

As discussed above, the PTC resistor 20 exhibits increased resistance as temperature rises, until it reaches a trip temperature at which its resistance reaches a maximum and does not change with further temperature increases. Another characteristic of the PTC resistor 20 is that its failure mode is open-circuit. That is, when the PTC resistor 20 fails (due to excessively high temperature or for other reasons), its resistance increases to infinity, and it prohibits further current flow through it. Thus, an additional benefit of the present invention is that in the event of component failure, the PTC resistor 20 acts as a fuse, opening the circuit and rendering it inherently safe until the PTC resistor 20 is replaced.

The present invention has been described herein with respect to protecting components in a motor circuit, such as a circuit powering an aftermarket vehicle winch. However, those of skill in the art will recognize that a broad variety of aftermarket vehicle products may benefit from the thermal protection of the present invention. The overcurrent protection circuit of the present invention may additionally find utility in a broad number of applications within a vehicle, where low-voltage, high-current faults or heavy usage present thermal hazards due to high currents. As used herein, the term "vehicle" is broadly defined, and includes any self-propelled human transportation mechanism that includes a battery, alternator or generator and one or more high-current loads such as a DC electric motor. As such, the term "vehicle" includes, for example, automobiles, trucks, motorcycles, All Terrain Vehicles (ATVs), boats, aircraft, trains and the like.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. An overcurrent protection circuit to limit the current in an electrical system, comprising:
   a first component having conductive and nonconductive states, and assuming the nonconductive state to interrupt current flow through the circuit for a duration in response to detecting sustained current in excess of a first predetermined current value, said first component returning to the conductive state following said duration; and
   a second component connected in series with said first component and operative to limit the current through the circuit to a second predetermined current value less than said first predetermined value in response to heat in excess of a predetermined thermal value.

2. The circuit of claim 1 wherein the heat is generated by current through said second component when said first component is in the conductive state.

3. The circuit of claim 1 wherein said first component comprises an auto-reset breaker.

4. The circuit of claim 3 where said auto-reset breaker is thermally actuated.

5. The circuit of claim 1 wherein said second component comprises one or more positive temperature coefficient (PTC) resistors connected in parallel with each other, said PTC resistor(s) exhibiting increased resistance with temperature up to a trip point at which said resistance is constant.

6. The circuit of claim 5 wherein said second predetermined current value is the voltage across said PTC resistor(s) divided by said constant, trip point resistance.

7. A method of protecting an electrical system from excessive current, comprising:
   detecting sustained current in excess of a first predetermined current value;
   interrupting the current flow through the system for a duration in response to detecting said excess current;
   restoring the current flow following said duration;
   detecting heat in said electrical system in excess of a predetermined thermal value; and
   limiting the current in said system to a second predetermined current value less than said first predetermined current value in response to detecting said excess heat.

8. The method of claim 7 wherein detecting sustained current in excess of a first predetermined current value comprises detecting heat in a thermally actuated auto-reset breaker, said breaker heat generated by said sustained current in excess of a first predetermined current value.

9. The method of claim 8 wherein interrupting the current flow through the system for a duration in response to detecting said excess current comprises tripping said auto-reset breaker in response to detecting said breaker heat.

10. The method of claim 8 wherein restoring the current flow following said duration comprises resetting said auto-breaker in response to the dissipation of said breaker heat.

11. The method of claim 7 wherein detecting heat is said electrical system in excess of a predetermined thermal value comprises rendering one or more positive temperature coefficient (PCT) resistors maximally resistive in response to said heat.

12. The method of claim 11 wherein said one or more PCT resistors comprise two or more PCT resistors connected in parallel with each other.

13. The method of claim 11 wherein limiting the current in said system to a second predetermined current value less than said first predetermined current value in response to detecting said excess heat comprises maintaining said PCT resistor(s) maximally resistive in response to said heat, said PCT resistor(s) selected such that the characteristic maximum resistance of said PCT resistor(s) is greater than the voltage across said PCT resistor(s) divided by said first predetermined current value.

14. An overcurrent protection circuit for a direct current (DC) electrical system, the overcurrent protection circuit having an input and an output, comprising:
   an auto-reset breaker connected to one of said input or said output; and
   a positive temperature coefficient (PTC) resistor assembly connected in series with said breaker and connected to the other one of said input or said output.

15. The circuit of claim 14 further comprising a thermal regulating housing containing said breaker and said PTC resistor assembly.

16. The circuit of claim 14 wherein said PTC resistor assembly comprises more than one PTC resistor.

17. The circuit of claim 16 wherein said more than one PTC resistors are connected in parallel.

18. An electrical system, comprising:
   a direct current power source;
   a load connected to said power source; and
   an overcurrent protection circuit connected in series between said power source and said load, said overcurrent protection circuit having an input and an output and comprising:
      an auto-reset breaker connected to one of said input or said output; and
      one or more positive temperature coefficient resistors connected in parallel with each other, connected in series with said breaker and connected to the other one of said input or said output.

19. The system of claim 18, wherein said load is an electric motor.

20. The system of claim 18, wherein said load is an aftermarket vehicle winch.

21. A vehicle, comprising:
   a direct current (DC) electrical power source;
   a load connected to said power source; and
   an overcurrent protection circuit connected in series between said power source and said load, said overcurrent protection circuit having an input and an output and comprising:
      an auto-reset breaker connected to one of said input or said output; and
      one or more positive temperature coefficient resistors connected in parallel with each other, connected in series with said breaker and connected to the other one of said input or said output.

22. The vehicle of claim 21 wherein said electrical power source is a battery.

23. The vehicle of claim 21 wherein said load is an electric motor.

* * * * *

UNITED STATES PATENT AND TRADEMARK OFFICE
CERTIFICATE OF CORRECTION

| | |
|---|---|
| PATENT NO. | : 7,145,759 B2 |
| APPLICATION NO. | : 10/877321 |
| DATED | : December 5, 2006 |
| INVENTOR(S) | : Francis |

It is certified that error appears in the above-identified patent and that said Letters Patent is hereby corrected as shown below:

Column 7, line 19, should read --in excess of a predetermined thermal value, following at least one cycle of said first component assuming a nonconductive state--.

Column 7, lines 43-44, should read --after restoring the current flow, detecting heat in said electrical system in excess of a predetermined thermal value; and--

Column 8, lines 16-17, should read --an auto-reset breaker operative to intermittently interrupt current flow through the overcurrent protection circuit connected to one of said input or said output; and--

Column 8, lines 18-20, should read -- a positive temperature coefficient (PTC) resistor assembly operative to limit current flow through the overcurrent protection circuit following at least one interruption of current flow by said breaker connected in series with said breaker and connected to the other one of said input or said output--.

Column 8, lines 35-36, should read --an auto-reset breaker operative to intermittently interrupt current flow from said power source in response to excess current connected to one of said input or said output; and--

Column 8, lines 37-40, should read -- one or more positive temperature coefficient resistors connected in parallel with each other and operative to limit current flow from said power source following at least one interruption of current flow by said breaker connected in series with said breaker and connected to the other one of said input or said output--.

Column 8, lines 52-53, should read -- an auto-reset breaker operative to intermittently interrupt current flow from said power source in response to excess current connected to one of said input or said output; and--

UNITED STATES PATENT AND TRADEMARK OFFICE
CERTIFICATE OF CORRECTION

PATENT NO.        : 7,145,759 B2
APPLICATION NO.   : 10/877321
DATED             : December 5, 2006
INVENTOR(S)       : Francis It is certified that error appears in the above-identified patent and that said Letters Patent is hereby corrected as shown below:

Column 8, lines 54-57, should read -- one or more positive temperature coefficient resistors connected in parallel with each other and operative to limit current flow from said power source following at least one interruption of current flow by said breaker connected in series with said breaker and connected to the other one said input or said output--.

Signed and Sealed this

Sixth Day of February, 2007

JON W. DUDAS
*Director of the United States Patent and Trademark Office*